Terhune & Romaine.
Potato Digger.

Nº 86,190.  Patented Jan. 26, 1869.

Witnesses:
Simeon T. Labuskie
Oscar Van Houten

Inventors:
R. P. Terhune
B. F. Romaine

R. P. TERHUNE AND B. J. ROMAINE, OF HACKENSACK, NEW JERSEY.

Letters Patent No. 86,190, dated January 26, 1869.

IMPROVEMENT IN POTATO-PLOW.

The Schedule referred to in these Letters Patent and making part of the same

*To all whom it may concern:*

Be it known that we, R. P. TERHUNE and B. J. ROMAINE, both of Hackensack, county of Bergen, and State of New Jersey, have invented a new and useful Improvement in Potato-Plows; and do hereby declare that the following is a full, clear, and exact description of the same, reference being had to the accompanying drawings, making part of this specification, of which—

Figure 1:
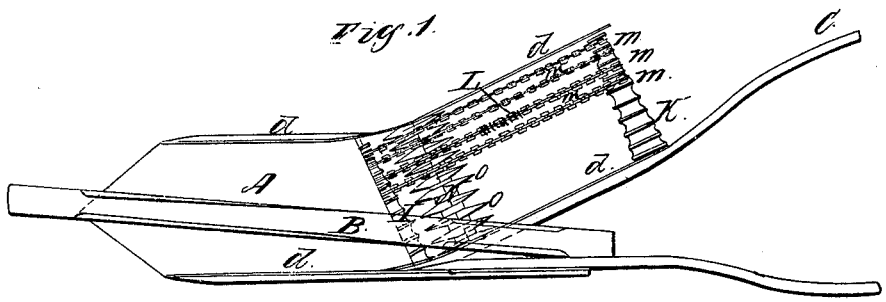

Figure 1 is a top view.

Figure 2:
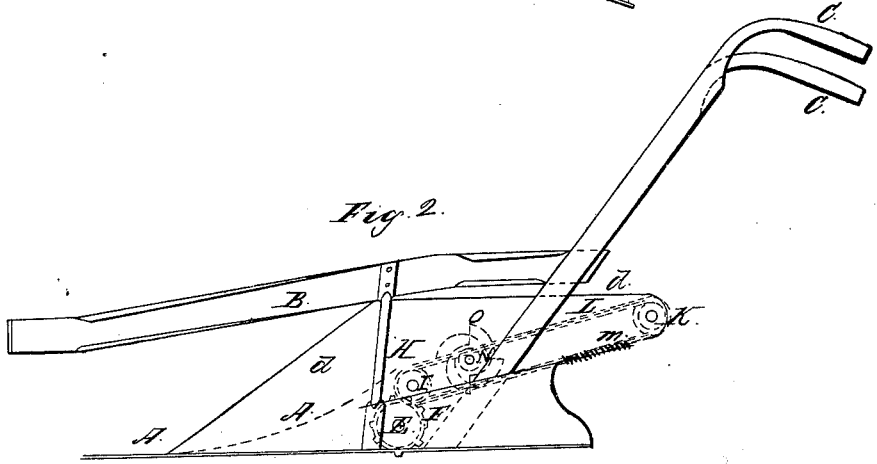

Figure 2, a side elevation.

Figure 3:
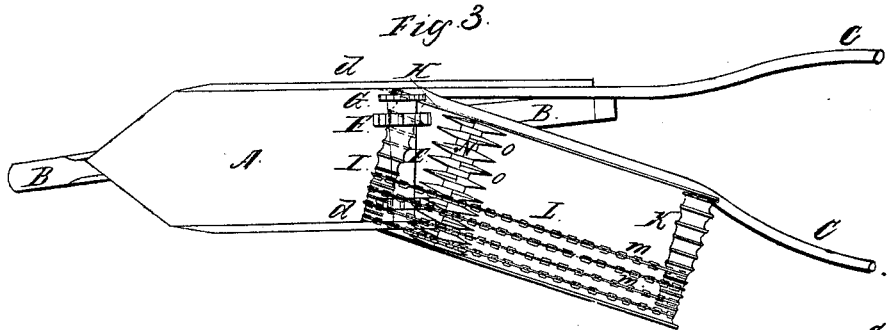

Figure 3, an under-side view.

This invention relates to an improved plow for digging up and separating potatoes from the earth in which they are raised; and consists of a scoop-formed plow,, connected with a revolving screen, over which the earth and potatoes are carried, the revolving screen permitting the earth to drop through, while the potatoes remain on its surface until discharged by the screen itself in its revolution, the screen being composed of a series of endless chains, which travel over conical-grooved rollers, enabling the chains to travel with varied velocity, said chains being guided in their passage by a series of eccentrics, placed on an intermediate shaft, motion being imparted to the conical rollers, carrying the revolving screen, by a driving-wheel which runs on the surface of the ground, and whose shaft carries a gear, which meshes into another gear on the forward conical shaft.

In the said drawings—

A denotes the plowshare;

B, the beam; and

C C, the handles of the plow.

The plowshare has guards or cutters, $d\ d$, which extend upward and rearward, and sustain the driving and conical shafts.

Between the said guards $d\ d$, and below the plowshare A, is placed the driving-shaft E, carrying the driving-wheel F, and a driving-gear, G, which meshes into a gear, H, on the forward conical-grooved roller I.

K is the rear conical-grooved roller, and L is the revolving screen, composed of endless chains $m\ m$, &c., the ends of said chains being united by spiral-spring connections $m'\ m'$, so as to form endless chains, which are carried by said rollers, and enabling the chains to travel with different speed.

N is a loose eccentric-shaft, (of which there may be one or more,) carrying a series of semi-eccentrics. $o\ o$, &c. These eccentrics serve to guide the chains over the conical-grooved rollers, as well as to break or cut up the lumpy earth and vegetable matter, and release the potatoes contained therein.

The operation of our invention is as follows:

The plow being hitched to the draught-animals, the handles held by the plowman, and the animals started, the plow will descend to the proper depth, and the earth, carrying the potatoes with it, will be forced up the scoop A, thence on the screen L, and sifted, the earth passing through the screen, while the potatoes remain on its surface till discharged by the revolving screen.

Having described our invention,

What we claim as new, and desire to secure by Letters Patent, is—

1. The revolving screen L, composed of endless chains $m\ m$, substantially as and for the purposes described and set forth.

2. The conical-grooved rollers I K, carrying the revolving screen, and enabling the chains of which said screen is composed to travel with different speed, as set forth.

3. The use of one or more grooved rollers, N, carrying semi-eccentric flanges for breaking up the lumpy earth and guiding the endless chains in their passage, as set forth.

4. In combination, the plow A, guards or cutters $d\ d$, and driving-mechanism, substantially as and for the purposes described and set forth.

In testimony whereof, we have hereunto set our signatures, this 23d day of May, 1868.

R. P. TERHUNE.
B. J. ROMAINE.

Witnesses:
SIMEON T. ZABRISKIE,
OSCAR VAN HOUTEN.